Jan. 15, 1963   M. K. FARRAR ETAL   3,073,098
APPARATUS FOR HARVESTING CASTOR BEANS
Filed April 15, 1960   7 Sheets-Sheet 1
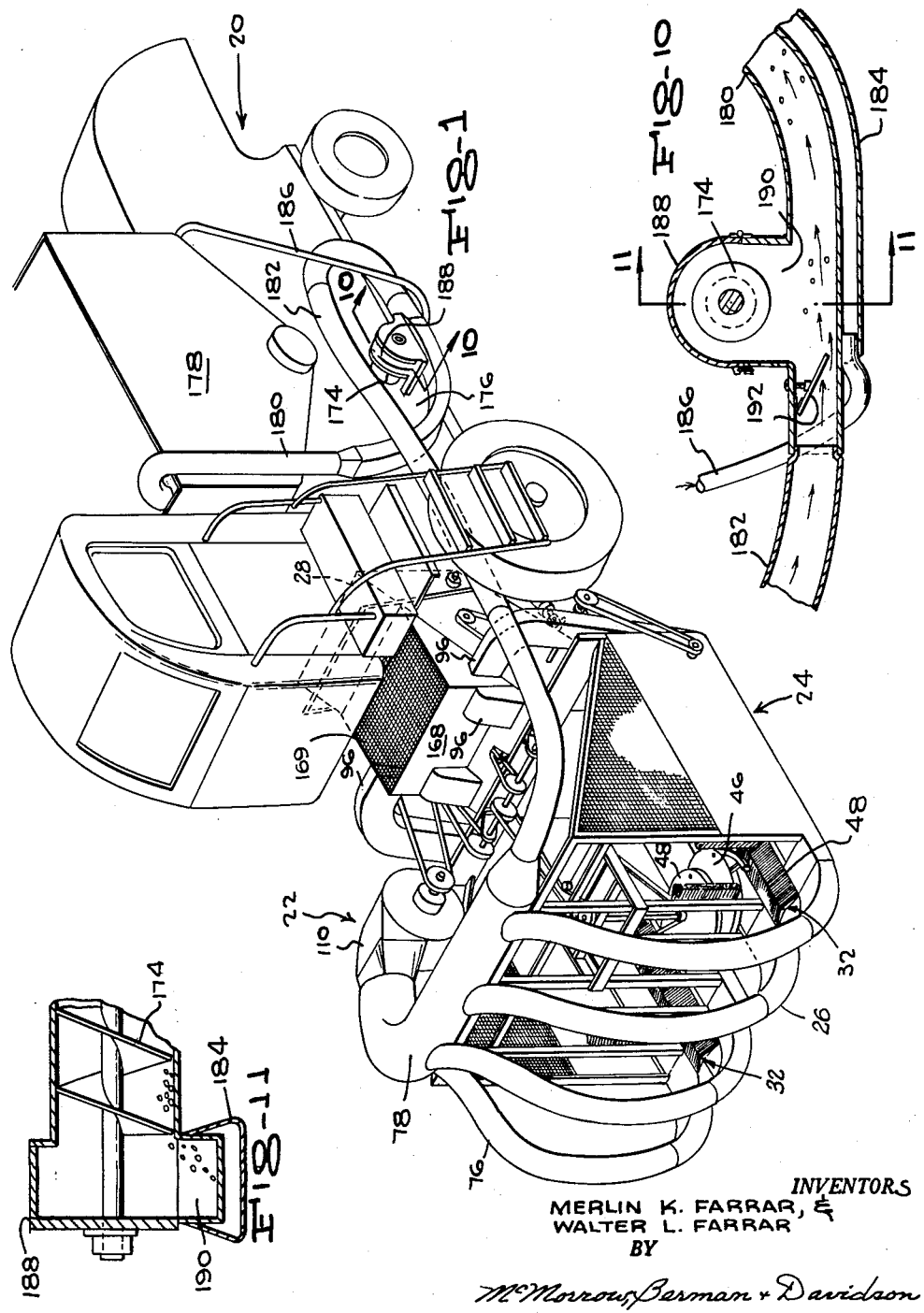
INVENTORS
MERLIN K. FARRAR, &
WALTER L. FARRAR
BY
McMorrow, Berman & Davidson
ATTORNEY

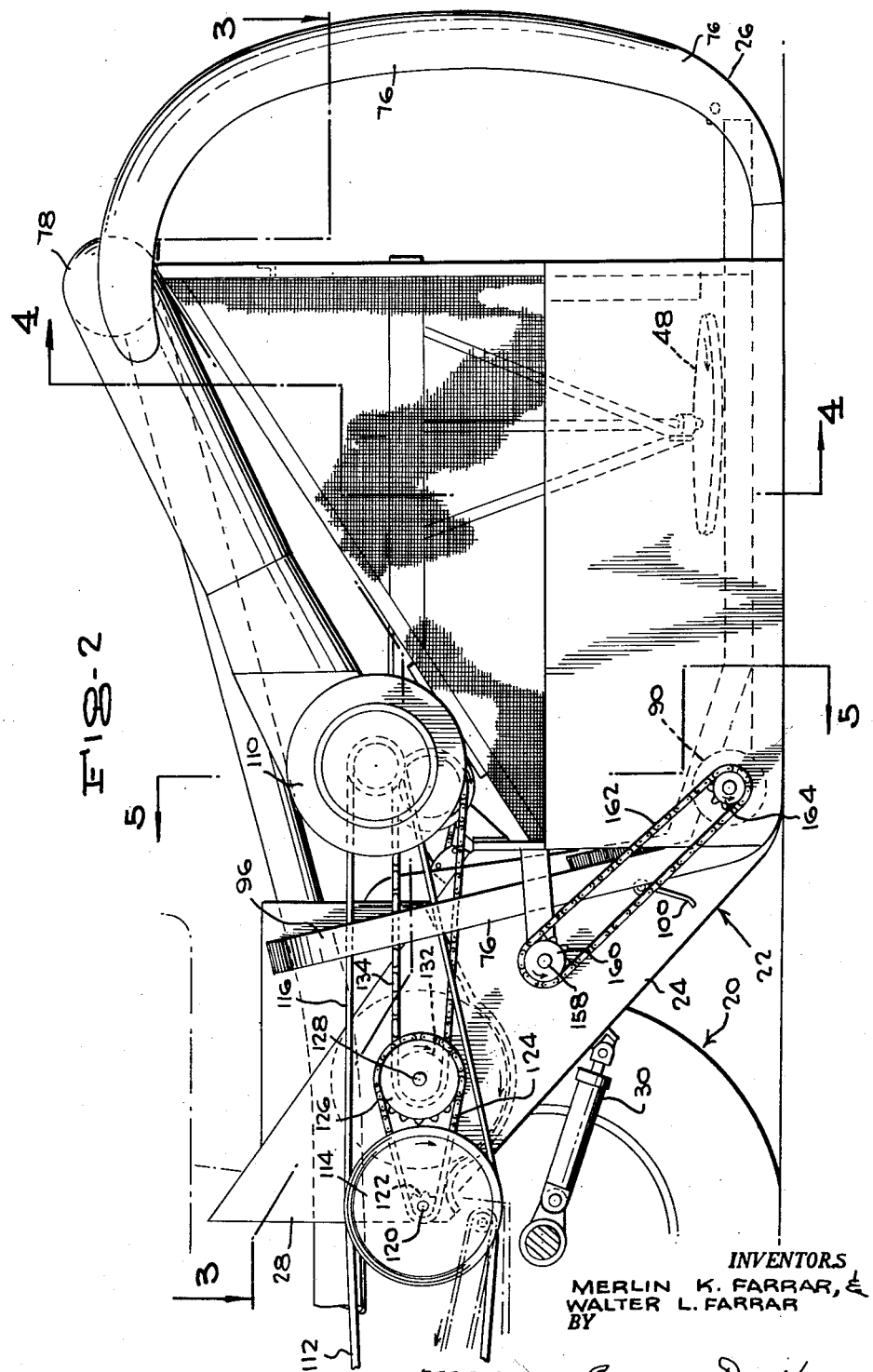

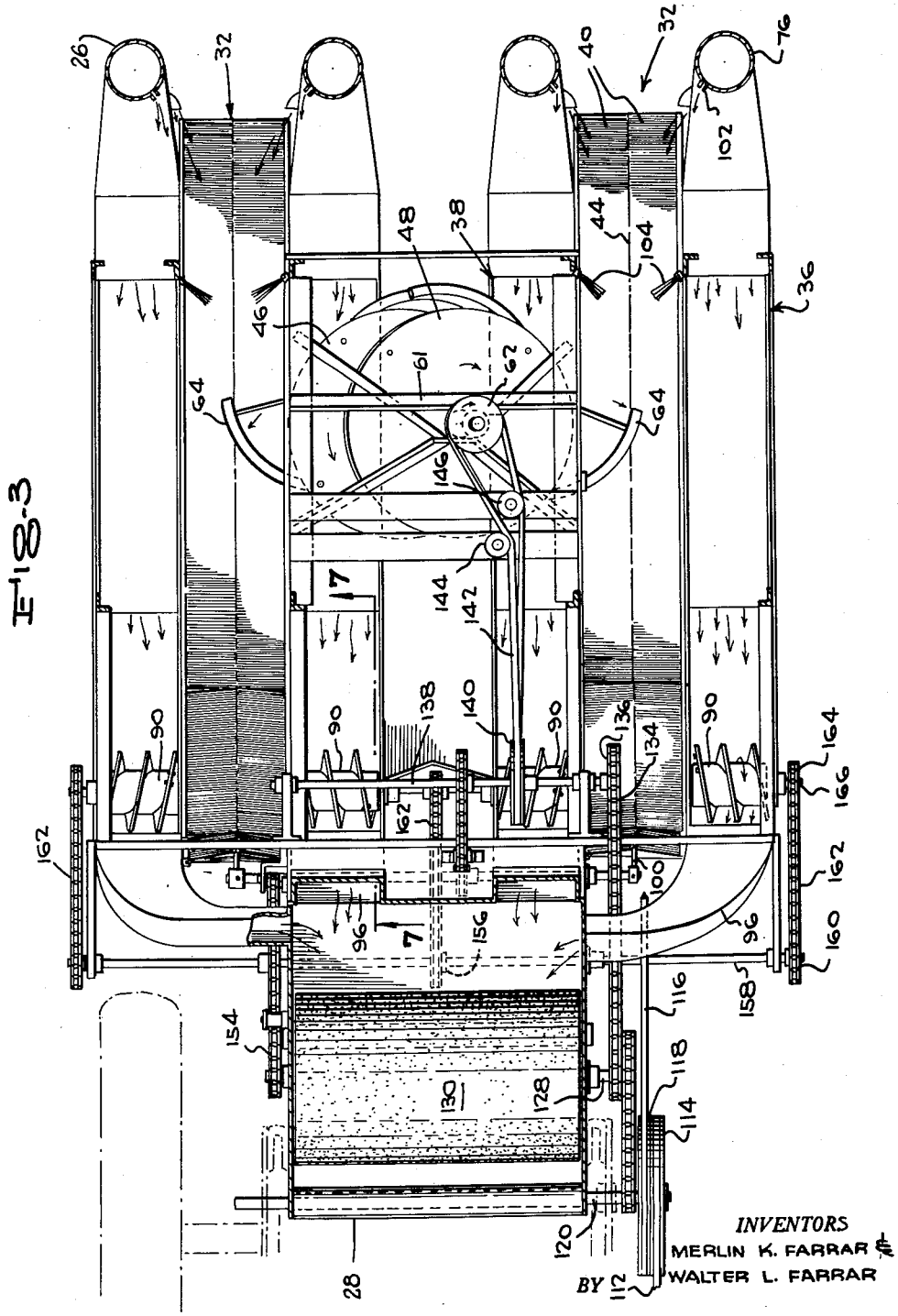

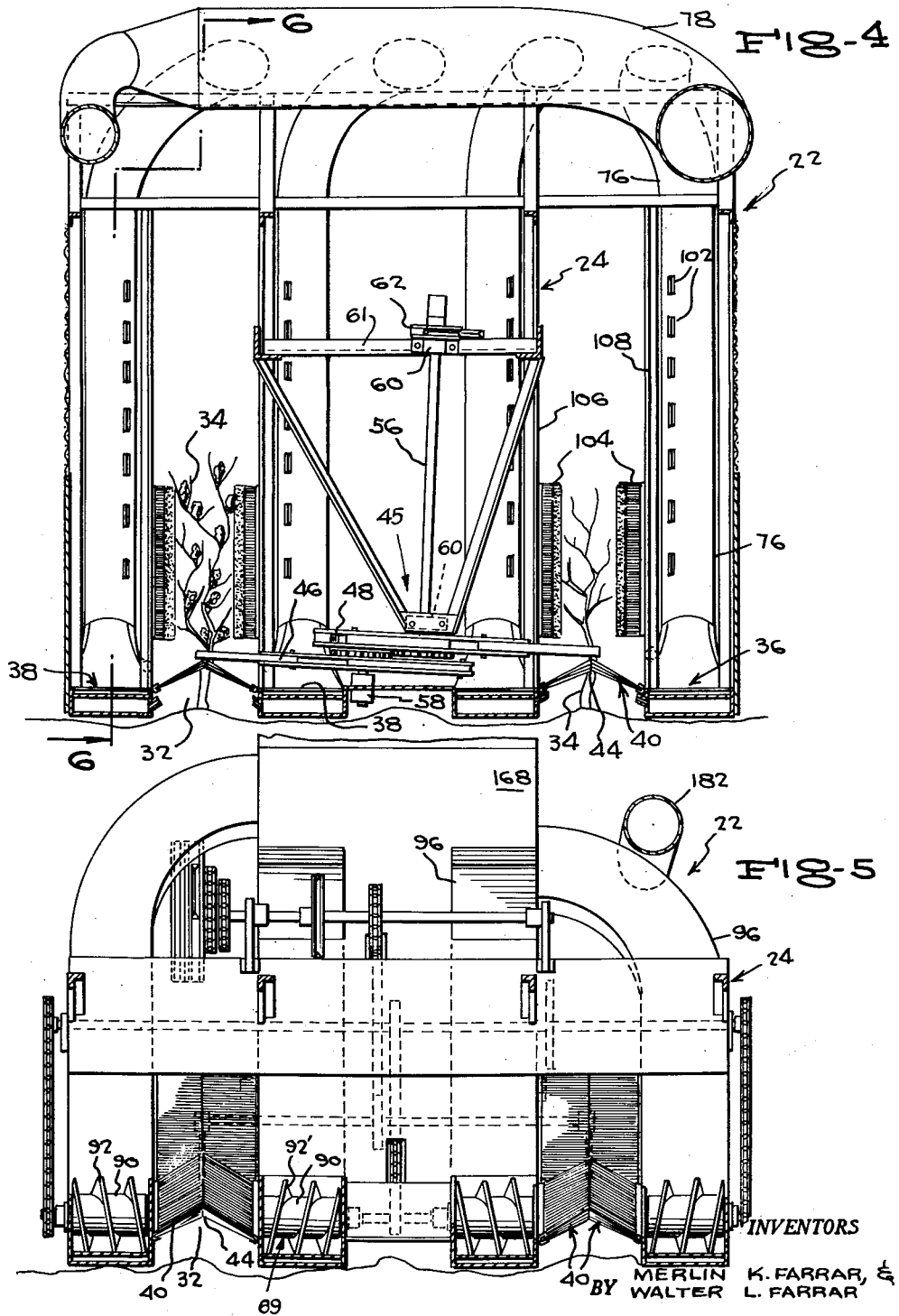

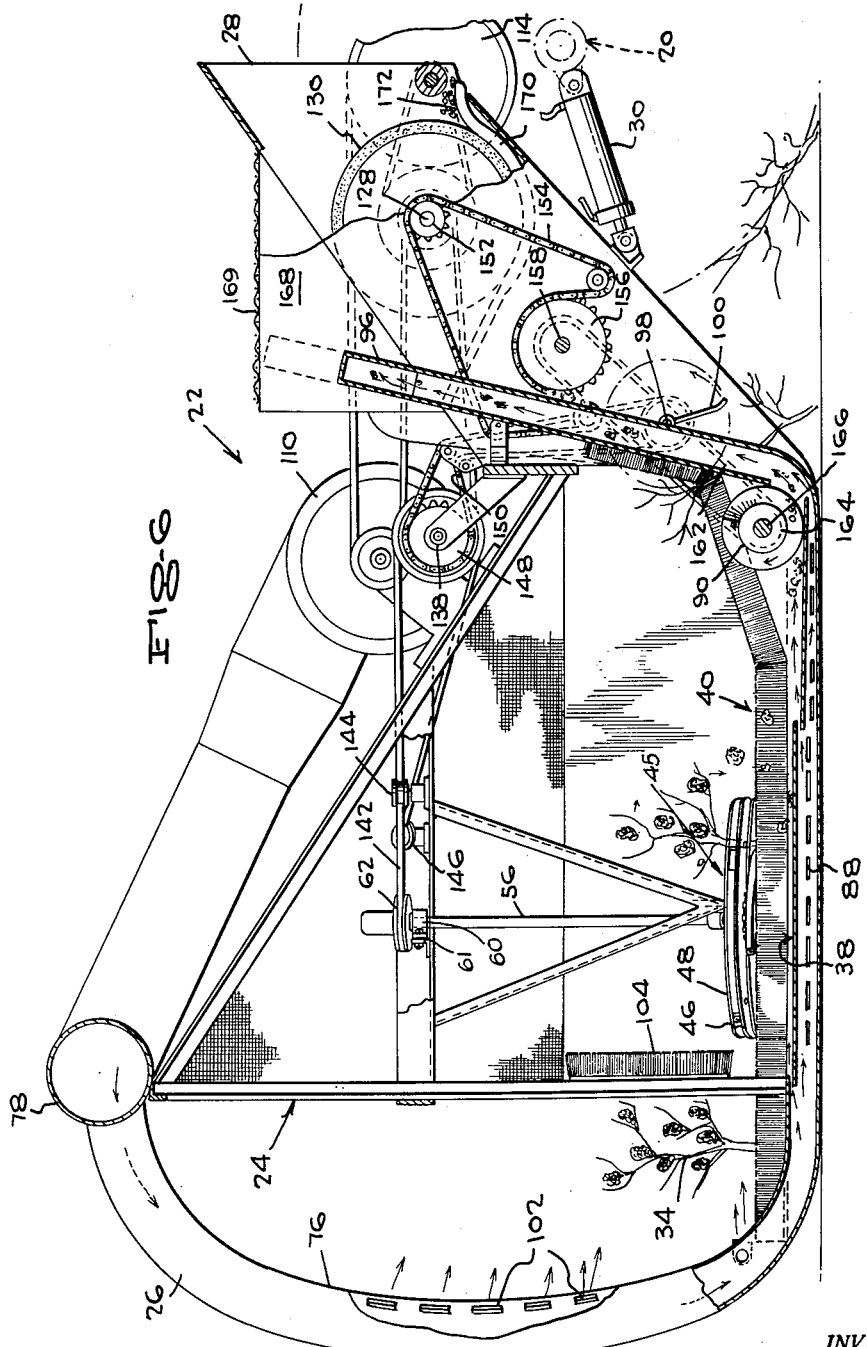

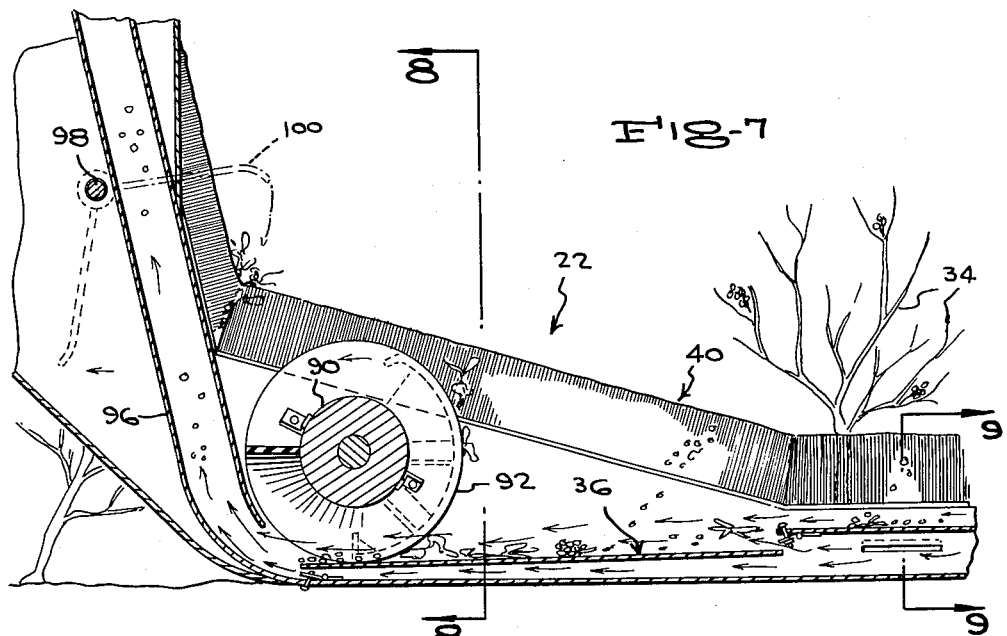
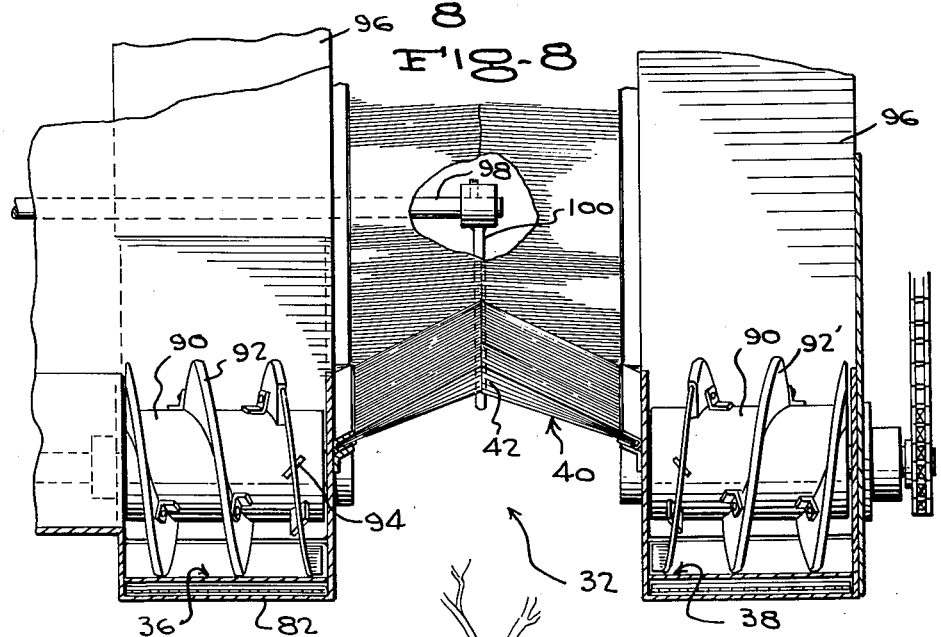
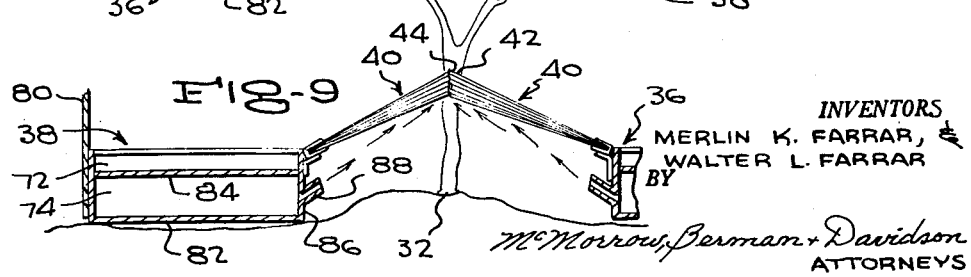

Jan. 15, 1963　　M. K. FARRAR ETAL　　3,073,098
APPARATUS FOR HARVESTING CASTOR BEANS
Filed April 15, 1960　　7 Sheets-Sheet 7
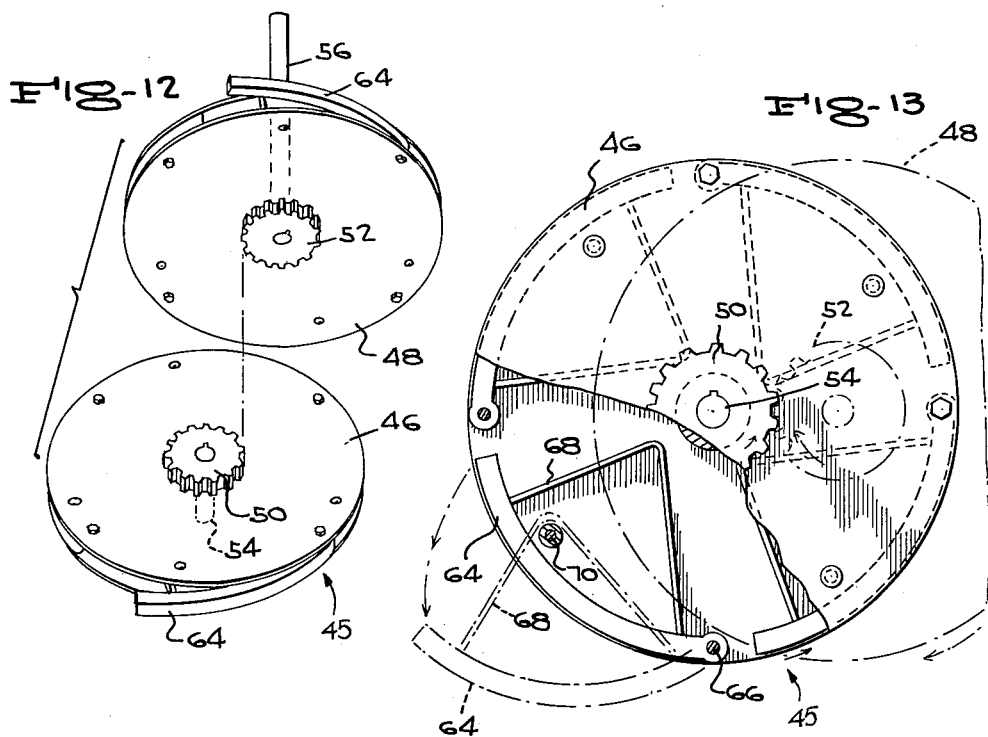
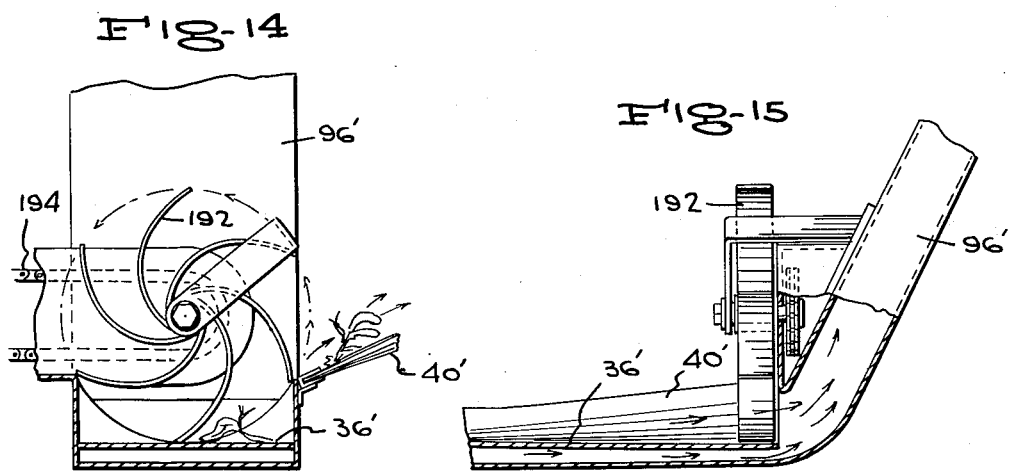
INVENTORS
MERLIN K. FARRAR &
WALTER L. FARRAR
BY
McMorrow, Berman + Davidson
ATTORNEYS

United States Patent Office 3,073,098
Patented Jan. 15, 1963

3,073,098
APPARATUS FOR HARVESTING CASTOR BEANS
Merlin K. Farrar and Walter L. Farrar, Hugoton, Kans.
Filed Apr. 15, 1960, Ser. No. 22,479
10 Claims. (Cl. 56—19)

This application relates to an apparatus for harvesting castor beans.

The harvesting of castor beans has in the past presented many problems. Castor bean threshing machines have been proposed and are presently in use and are not entirely satisfactory. The main objection to the castor bean threshing machines presently available for purchase is that the machine has a single use and after the harvest of the beans, the machine is not used again until the growing and maturing of another crop of beans. Additionally, considerable loss of beans as the beans are harvested has been the experience of all castor bean growers using the machines commercially available, due to the nature of the bean and its habit of growth.

An object of the present invention is to provide a castor bean harvesting machine or apparatus which lends itself to attachment to a conventional grain combine, so that the beans are harvested and threshed in a single operation, the attachment being adaptable with minor changes to all combines.

Another object of the present invention is to provide a castor bean harvesting apparatus which leaves fewer beans unharvested or lost on the ground than machines presently in use.

A further object of the present invention is to provide a castor bean harvesting apparatus which enables an operator to grow and efficiently harvest a crop that has been largely neglected due to the inherent difficulty in harvesting and threshing the crop.

A still further object of the present invention is to provide a castor bean harvesting apparatus which is simple in structure, one which lends itself to manufacture at reasonable cost far less than the harvesting and threshing machines presently available, and one which is highly effective in action.

These and other objects and advantages of the present invention will be fully apparent from the following description when taken in conjunction with the annexed drawings, in which:

FIGURE 1 is an isometric view of the apparatus of the present invention, shown attached to a combine;

FIGURE 2 is a side elevational view, on an enlarged scale, of the apparatus of the present invention;

FIGURE 3 is a view taken on the line 3—3 of FIGURE 2;

FIGURE 4 is a view taken on the line 4—4 of FIGURE 2;

FIGURE 5 is a view taken on the line 5—5 of FIGURE 2;

FIGURE 6 is a view in elevation, partially in section, with parts broken away;

FIGURE 7 is a view taken on the line 7—7 of FIGURE 3, on an enlarged scale;

FIGURE 8 is a view taken on the line 8—8 of FIGURE 7, with parts broken away;

FIGURE 9 is a view taken on the line 9—9 of FIGURE 7;

FIGURE 10 is a view taken on the line 10—10 of FIGURE 1, on an enlarged scale;

FIGURE 11 is a view taken on the line 11—11 of FIGURE 10;

FIGURE 12 is an isometric exploded view of the knocker assembly;

FIGURE 13 is an enlarged plan view with a portion broken away of the knocker assembly shown in FIGURE 12;

FIGURE 14 is a front elevational view partially in section of a modified form of the trash removing assembly; and FIGURE 15 is a side elevational view partially in section of the trash removing assembly shown in FIGURE 14.

Referring in greater detail to the drawings in which like numerals indicate like parts throughout the several views, in FIGURE 1, the reference numeral 20 designates generally a combine for grain and the reference numeral 22 designates generally the castor bean harvesting apparatus of the present invention.

The apparatus 22 includes a frame structure 24 having a forward end 26 and a rearward end 28. The frame structure 24 is adapted for movement over a ground surface when attached to the combine 20 by conventional means including a hydraulic cylinder assembly 30 on each side thereof, as shown in FIGURE 2 and FIGURE 6.

With particular reference to FIGURES 3, 4, and 5, the apparatus 22 provides a pair of laterally spaced pathways 32 extending from the forward end 26 to the rearward end 28 of the apparatus frame structure 24. The pathways 32 are identical and are fixedly supported in spaced relation above the ground surface for travel therethrough of a row of upstanding castor bean plants or stalks having beans thereon, as designated by the reference numeral 34 in FIGURE 4.

Aprons 36 and 38 are on each side of and below the level of the pathways 32 and are fixedly attached to the adjacent pathway 32 and to the frame structure 24.

Each pathway 32 includes two rows of resilient fingers 40 arranged in upwardly and inwardly converging relation and positioned so that the converging ends are midway between and above the adjacent apron 36 or 38 and interengage each other with the fingers 40 of each row sloping downwardly toward the adjacent apron 36 or 38. The downwardly sloping fingers 40 form sloping runways and the diverging ends of the fingers 40 are received in the adjacent aprons 36 and 38.

The converging ends, as at 42, of the fingers 40 form a freely openable and closable slit as at 44 in FIGURE 9. The slit 44 in each pathway 32 extends from the forward end 26 of the frame structure 24 to the rearward end 28. The fingers 40, which form runways to each side above the aprons 36 and 38, are fabricated of relatively stiff material so that when a stalk 34 passes between the converging ends 42 of the fingers 40, the slit 44 closes immediately upon passage of the stalk 34.

Knocker means 45 is provided by the present invention disposed above and adjacent the rows of fingers 40 and is movable across the slit 44 for imparting a beating force to the stalks 34 as they travel through the slit 44. The knocker means is shown best in FIGURES 3, 12, and 13, and it consists in a pair of discs 46 and 48 arranged in spaced confronting face to face relation and offset from each other. Spur gears 50 and 52 are secured to the shafts 54 and 56 which support the discs 46 and 48, respectively, and are in meshing engagement with each other. As shown most clearly in FIGURE 4, the shaft 54, which supports the disc 46, is journaled in bearing blocks 58 mounted in the frame structure 24. The shaft 56 is also supported in the frame structure 24 in bearing blocks 60 mounted on cross members 61, as shown in FIGURES 3 and 4, and the shaft 56 carries a pulley 62 adjacent the upper end thereof.

Each of the discs 46 and 48 carries a plurality of arms 64 pivotally connected thereto and rotatable about a vertical axis. The structure is seen best in FIGURE 13 in which it is shown that each arm 64 is connected to the periphery of the associated disc by means of a pivot pin 66. Each arm 64 is movable from the full line position outwardly to the dotted line position in FIGURE 13 responsive to centrifugal force when the disc 46 or disc 48 is rotated. A V-shaped bar 68 has its ends anchored in the arm 64 and its apex engageable with a stop 70 projecting upwardly from the disc for limiting the outward movement of each arm 64 when the disc 46 or 48 is rotated.

As shown in FIGURE 3, due to the offset relation of the discs and 4 relative to each other, the disc 46 has its arms 64 traveling across the slit in the pathway 32 on one side of the machine, while the disc 48 has its arms 64 traveling across the pathway 32 on the other side of the machine.

Air current directing means is provided adjacent the forward end of said aprons 36 and 38 for directing an air current blanket along and above and adjacent each apron 36 and 38 associated with each of the pathways 32 on each side of the machine. Specifically, this means consists in, as shown in FIGURE 9, a top chamber 72 opening outwardly over the apron 36 as in FIGURE 3, and a bottom chamber 74 opening out on to the apron 36 at a distance from the opening of the chamber 72. Both the chambers 72 and 74 are connected to an upwardly extending rigid tube 76 which has its upper end connected to a main supply conduit 78.

The flow of the air from the openings of the chambers 72 and 74 is indicated by arrows in FIGURE 3.

The chambers 72 and 74 are formed by an outside panel 80, a bottom 82, a partition 84, and a top which forms the apron 36. An inner wall 86 joins the ends of the bottom 82 and the partition 84 together and is provided with a plurality of spaced slits each having an upwardly sloping nozzle for directing a blast of air upwardly to the converging ends 42 of the fingers 40, the nozzle being designated by the reference numeral 88. The nozzles 88 in association with the chamber 74 and the supply tube 76 constitute means for directing air current from below and upwardly toward the underfaces of the runways formed by the fingers 40 along the entire length thereof for holding castor beans above the runways as the plants or stalks 34 travel through the slit 44.

Separating means is provided extending across the rearward end of each of the aprons 36 and 38. This means is in communication with the sloping runways formed by the fingers 40 and the air current blanket means providing the blast of air over the aprons 36 and 38 for extracting the debris from the castor beans carried on the aprons 36 and 38. Specifically, this separating means 89 consists in a cylinder 90 having a screw thread 92 fabricated of rubber belting or the like extending therearound, as shown most clearly in FIGURE 8. The cylinder 90 of each pathway 32 constitutes a rotary conveyor rotatable about a horizontal axis transverse of the adjacent apron 36 or 38. As shown in FIGURE 8, the screw thread on the cylinder 90 associated with the apron 38 is wound in the opposite pitch from the screw thread 92 on the cylinder 90 associated with the apron 36. The screw thread on the cylinder 90 associated with the apron 38 is designated by the numeral 92'.

The portions of the screw threads 92, 92' adjacent the fingers 40 are provided with blades or paddles 94 (FIGURE 8) which engage the debris as it is forced along the associated cylinder 90 by the screw threads 92, 92' when the cylinder 90 rotates. With reference to FIGURE 7, the cylinders 90 rotate in the counterclockwise direction which carries the debris upwardly and deposits the same on the upper end of the runways formed by the fingers 40. The castor means are blown over the apron 36 and passed between the turns of the screw threads 92, 92' to the rearward side of the cylinders 90. Here they are caught in another air blast and are forced upwardly through a tube 96 to a place of treatment on the combine 20. A horizontally disposed shaft 98 is positioned rearwardly of the upper end of the runways formed by the fingers 40 and carries on its free end the sweep arm 100 which rotates in the clockwise direction (FIGURE 7) to brush the debris from the fingers 40 outwardly through the rear of the machine and onto the ground surface between the two rows which are being harvested at one time.

Means is provided adjacent to and above the forward end of the sloping runways formed by the fingers 40 for directing an air current column in a direction above and toward the rearward end of the runways. This means comprises an upstanding tunnel member, embodying the tube 76, rising from the forward end of each apron and nozzles 102 on the tube 76 extending along the tube 76 in spaced relation with respect to each other.

Throat means is provided positioned above the runways formed by the fingers 40 inwardly of and adjacent the front end of the slit 44 for confining the plants as they travel through the slit 44. This throat means consists in two vertically disposed rows of resilient fingers 104 arranged in spaced confronting opposed relation and positioned so that the nonconfronting ends of the fingers lie along the lower ends of the runways formed by the fingers 40 with the confronting ends of the fingers facing toward each other and spaced from each slit 44. As shown in FIGURE 4, the nonconfronting ends of the fingers 104 are secured to upright members 106 and 108 of the frame structure 24.

The blower housing 110 is mounted upon the frame structure 24 on one side of the latter and is in communication with the conduit 78 which feeds air under pressure into the four tubes 76 which project forwardly from the apparatus 22.

With reference to FIGURE 2, the mechanism of the apparatus 22 is driven by a main belt 112 extending to and driven by the power take-off, not shown, of the combine 20. The belt 112 travels over a main drive pulley 114 mounted for rotation in the frame structure 24. The blower fan within the housing 110 is driven by a belt 116 which travels over another pulley 118 mounted upon the same shaft 120 which carries the drive pulley 114, as shown in FIGURE 3.

The shaft carries a sprocket wheel 122 (FIGURE 2) over which travels a chain 124 drivingly connected to another sprocket wheel 126 mounted upon a rotatable shaft 128. The shaft 128 carries a resiliently coated drum 130 which is part of the hulling apparatus employed to remove the husks from the castor beans.

Mounted upon the shaft 128 is another sprocket wheel 132 (FIGURE 2) drivably connected by another chain 134 to a sprocket wheel 136 on one end of a cross shaft 138 (FIGURE 3), which is journaled in the frame structure 24 by suitable bearings.

A pulley 140 on the shaft 138 carries a belt 142 which connects the pulley 62 to the shaft 138 for rotation therewith. Conventional idler pulleys 144 and 146 change the direction of the belt 142 in the conventional manner.

A sprocket wheel 148 mounted on the cross shaft 138 is connected by a chain 150 to the shaft 98.

A sprocket wheel 152 on the shaft 128 is drivably connected by a chain 154 to a sprocket wheel 156 mounted upon another cross shaft 158. The shaft 158 extends from one side of the apparatus to the other, as shown most clearly in FIGURE 3, and carries on its ends sprocket wheels 160 connected by chains 162 to other sprocket wheels 164 on the ends of the shaft 166 which carries the four cylinders 90.

With reference to FIGURE 1, each of the four tubes 96 terminate in the upper end of a hopper 168 having a screen 169 over the top for the escape of air which is employed to drive the castor beans upwardly through the tubes 96 into the hopper 168.

With reference to FIGURE 6, the castor beans in the hopper 168 are passed between the periphery of the drum 130 and a resilient plate 170 and are delivered rearwardly of the rear end of the hopper 178 into the combine 20. The beans are shown in FIGURE 6 at 172 passing out of the rearward end of the hopper 168. The action of the drum 130 and the plate 170 is to loosen and remove the beans from the husks surrounding them.

In the combine 20, the husks are separated from the beans and the beans are delivered by means of a screw conveyor 174 (FIGURES 10 and 11) rotatably mounted in the frame 176 of the combine 20 to the hopper 178.

The combine frame structure 176 carries a hopper 178 and the screw conveyor 174 has a discharge end connected by a conduit 180 to the upper end of the hopper 178, as shown in FIGURE 1.

Another conduit 182 extends from the terminating point of the conduit 78 on the apparatus 22 to the outlet means at the end of the screw conveyor 174. The conduit 182 constitutes means for directing an air current through the conduit 180 to pneumatically carry the castor beans from the discharge end of the screw conveyor 174 to the hopper 178.

Means is provided for heating the portion of the conduit 180 adjacent the screw conveyor 174 so that the oil from the castor beans does not congeal at this point. This means consists in conveying heat from the exhaust manifold of the engine of the combine to a jacket 184 surrounding the adjacent portion of the conduit 180, the jacket 184 being connected to the exhaust manifold by a pipe 186. A sleeve 188 is circumposed about the portion of the screw conveyor 174 adjacent the jacket 184 and has an outlet 190 communicating with the conduit 180, as in FIGURE 10. An adjustable valve 191 in the conduit 182 provides a means for controlling the flow of air past the outlet 190 for picking up the beans and conveying them upwardly through the conduit 180 to the hopper 178.

With reference to FIGURES 14 and 15, a modified form of the trash and debris separating means is shown at the end of one of the aprons designated by the numeral 36'. In this form of the invention, a horizontally rotatable wheel 192 sweeps across the area at the rearward end of the apron 36' and carries the debris onto the fingers 40' for removal therefrom by means of the arm 100 as heretofore described with reference to the first form of the invention. The wheel 192 is driven by a chain 194 connected to the driving mechanism of the apparatus 22. In this form of the invention, the beans are swept upwardly through the tube 96 to the hopper 168, as previously described.

In operation, castor beans are ready for harvesting after the area of growing has been subjected to a frost. The frost destroys most of the foliage on the castor bean plant and the beans remain in clusters at the juncture of each leaf stalk with the stem.

The apparatus 22 is with ease and facility attached to and supported on the forward end of the combine 20. As the combine travels over the ground surface, two rows of the plants or stalks 34 are received within the pathways 32, one on each side of the apparatus 22.

As the stalks enter the slits 44 formed by the converging ends 42 of the fingers 40, the arms 64 on the discs 46 and 48 swing outwardly under the action of centrifugal force and knock against the base of the stalks 34 to shake the beans from the stalks, the beans falling on to the fingers 40 and traveling thereover to the aprons 36 and 38. Blasts of air emitted by the tube 76 associated with each apron drive the beans to the rear to where they pass through the threads 92, 92' on the cylinders 90 and thence upwardly under a further blast of air through the tube 96 to the hopper 168. The debris is carried, either by the screw threads 92 and blades 94 on to the fingers 40 or by the wheel 192 over the fingers 40 for removal therefrom by the arms or arm 100 through the rearmost fingers 40 on to the ground surface at the rearward end 28 of the apparatus 22.

In the next step for processing the beans, the beans travel between the periphery of the drum 130 and the plate 170 into the combine 20 where they are separated from the husks and the beans without husks are delivered by the screw conveyor 174 into the sleeve 188.

Because of the treatment the beans have received, some of them are broken and the oil is frequently bled from one or more beans on to the walls of the conveyor and conduit 180. For this purpose, the heat of the exhaust gases from the engine of the combine 20 are conducted to the jacket 184 and then discharged to the atmosphere. This use of the heat of the engine exhaust gases at the juncture of the screw conveyor 174 with the conduit 180 keeps the beans in condition against congealing and permits their travel under a blast of air upwardly through the conduits 180 to the hopper 178 for storage therein until removal to a place of further treatment of storage.

What is claimed is:

1. In an apparatus for harvesting castor means, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, and air current directing means adjacent the forward ends of said aprons for directing an air current blanket along and above and adjacent each apron from the forward to the rearward end thereof.

2. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof, and separating means extending across the rearward end of each of said aprons and in communication with said sloping runways and said air current blanket means extracting the debris from the castor beans.

3. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof, and means adjacent to and above the forward end of said sloping runways for directing an air current column in a direction toward the rearward end of said runways.

4. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and downwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing air current blanket along and above and adjacent each apron from the forward to the rearward end thereof, separating means extending across the rearward end of each of each of said aprons and in communication with said sloping runways and said air current blanket means extracting the debris from the castor beans, and collection means in communication with each of said separating means for receiving the castor beans.

5. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof, and throat means positioned above said runways inwardly of and adjacent the front end of said slit for confining the plants as they travel through said slit.

6. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and downwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof, and means for directing an air current from below and upwardly toward the underfaces of said runways along the entire length thereof for holding the castor beans above said runways as the plants travel through said slit.

7. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and downwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, and air current directing means adjacent the forward ends of said aprons for directing an air current blanket along and above and adjacent each apron from the forward to the rearward end thereof, said knocker means embodying a disc carrying thereof, a plurality of arms pivotally connected thereto and rotatable about a vertical axis.

8. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and downwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof and means adjacent to and above the forward end of said sloping runways for directing an air current column in a direction above and toward the rearward end of said runways, said last-mentioned means comprising an upstanding tunnel member rising from the forward end of each apron, and means provided in each tunnel member for directing an air current column in a direction above and toward the rearward end of said runways.

9. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said apron for directing an air current blanket along and above and adjacent each apron from the forward to the rearward end thereof, and throat means positioned above said runways inwardly of and adjacent the front end of said slit for confining the plants as they travel through said slit, said throat means comprising two vertically disposed rows of resilient fingers arranged in spaced confronting opposed relation and positioned so that the non-confronting ends of said fingers lie along the lower ends of said runways with the confronting ends of said fingers facing toward each other and spaced from said slit.

10. In an apparatus for harvesting castor beans, a frame structure adapted for movement over a ground surface and having a forward and a rearward end, there being in said frame structure a pathway extending from the forward to the rearward end of said frame structure and fixedly supported in spaced relation above said ground surface for travel therethrough of a row of upstanding castor bean stalks having beans thereon to be harvested, an apron on each side of and below the level of said pathway and extending along said pathway and fixedly attached to said pathway and frame structure, said pathway including two rows of resilient fingers arranged in upwardly and inwardly converging relation and positioned so that the converging ends are midway between and above said aprons and interengage each other with the fingers of each row sloping downwardly toward the adjacent apron and forming sloping runways and having the diverging ends received in said aprons, the converging ends of said fingers forming a freely openable and closable slit extending from the forward to the rearward end of said frame structure for passage of said stalks therethrough, knocker means disposed above and adjacent said rows of fingers and movable across said slit for imparting a beating force to said stalks as they travel through said slit and shake the castor beans therefrom on to said sloping runways, air current directing means adjacent the forward ends of said aprons for directing an air current blanket along and above and adjacent each apron from the forward to the rearward end thereof, and separating means extending across the rearward end of each of said aprons and in communication with said sloping runways and said air current blanket means extracting the debris from the castor beans, said separating means comprising a rotary conveyor rotatable about a horizontal axis transverse of the adjacent apron.

References Cited in the file of this patent

UNITED STATES PATENTS

| | | |
|---|---|---|
| 1,122,375 | Engle | Dec. 29, 1914 |
| 2,641,888 | Grether | June 16, 1953 |
| 2,699,637 | Nisbet | Jan. 18, 1955 |
| 2,834,172 | Wood | May 13, 1958 |
| 2,847,766 | Silver | Aug. 19, 1958 |
| 2,853,844 | Nisbet | Sept. 30, 1958 |
| 2,929,152 | Berner | Mar. 22, 1960 |
| 2,952,962 | Suverkrop | Sept. 20, 1960 |